Patented Dec. 2, 1941

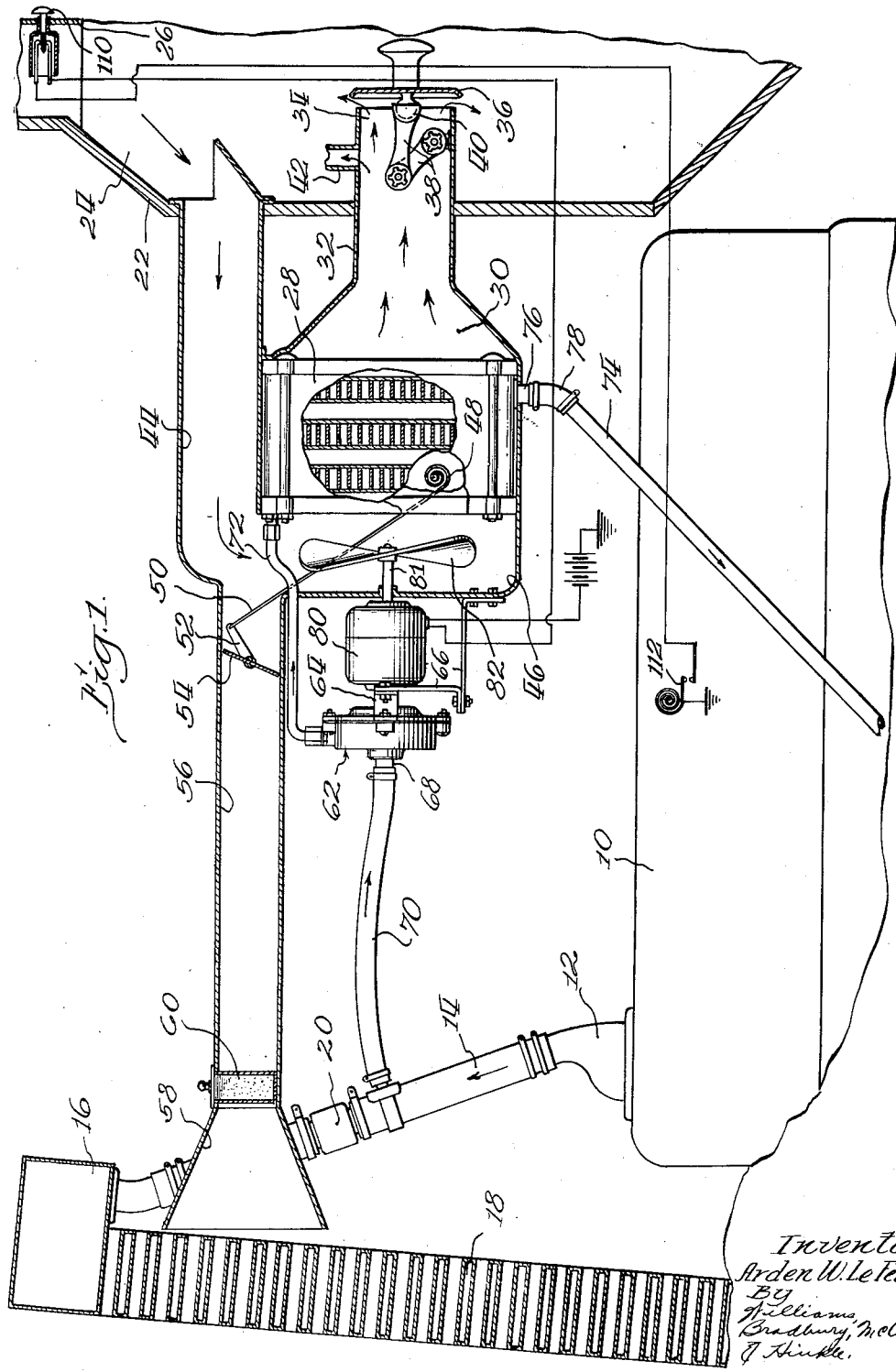

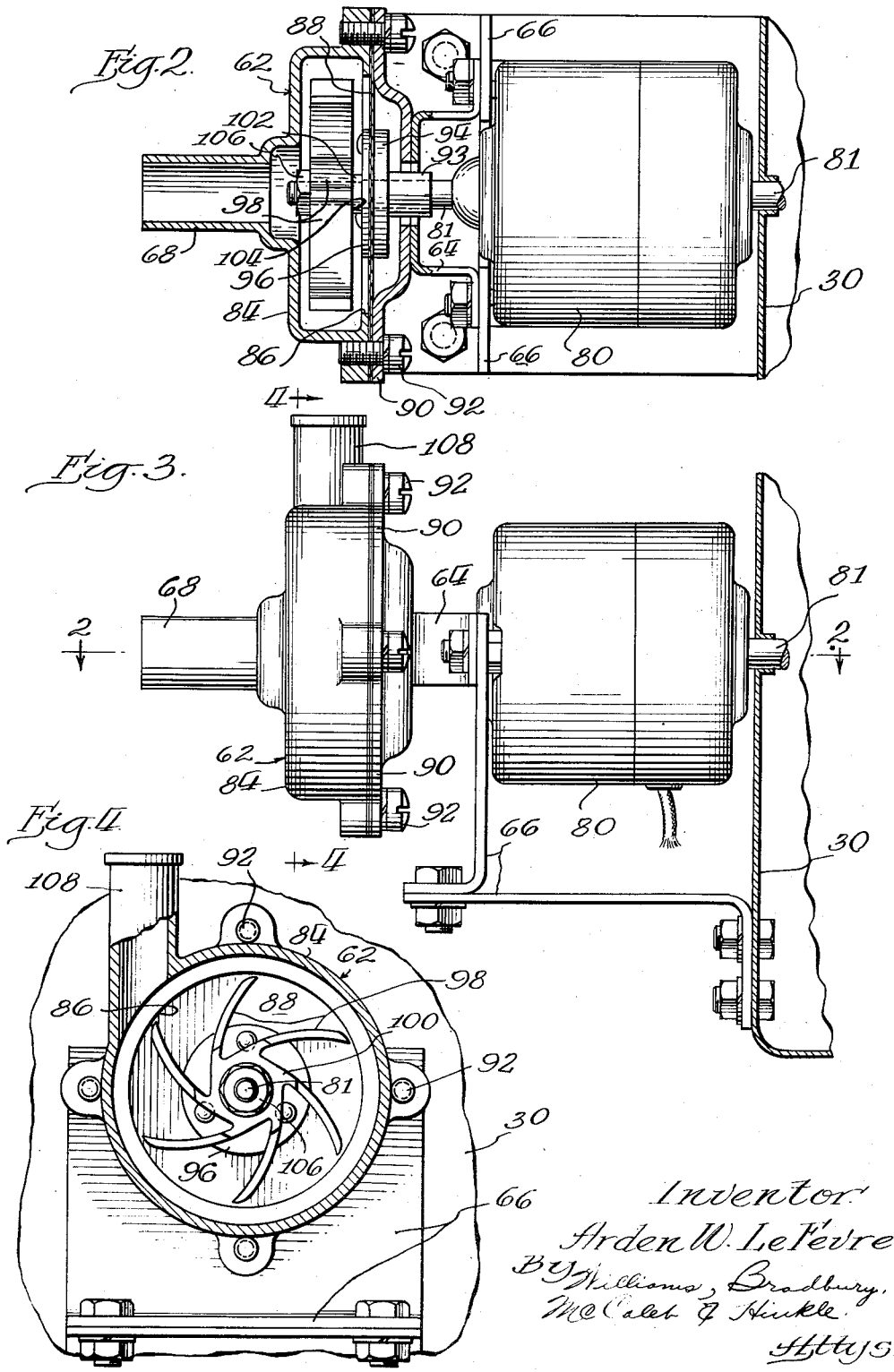

2,264,945

UNITED STATES PATENT OFFICE 2,264,945

PUMP

Arden W. Le Fevre, Chicago, Ill., assignor to Stewart-Warner Corporation, Chicago, Ill., a corporation of Virginia Application August 7, 1939, Serial No. 288,729

2 Claims. (Cl. 103—87)

My invention relates generally to automobile heaters, and more particularly to improvements in automobile heaters which utilize heat obtained from the water of the engine cooling system.

It is an object of my invention to provide an improved means for causing circulation of the water taken from the engine cooling system through the radiator of the heater.

A further object is to provide an improved thermostatically operated control for preventing operation of the air circulating fan of the heater until the water in the engine cooling system has attained a predetermined temperature.

A further object is to provide an improved heating system for automobiles in which, under appropriate conditions, the air from the passenger compartment of the vehicle is recirculated through the heater, while under other conditions, fresh air taken from outside the passenger compartment is introduced thereto through the heater.

A further object is to provide an improved water circulating pump adapted particularly for automobile heaters.

A further object is to provide an improved automobile heater which will be highly efficient in operation, which will be effective in extremely cold weather, and which may be economically manufactured and installed upon an automobile.

Other objects will appear from the following description, reference being had to the accompanying drawings, in which:

Figure 1 is a vertical cross sectional view of the heater and portions of the automobile upon which it is mounted;

Figure 2 is a central longitudinal sectional view of the improved water circulating pump taken on the line 2—2 of Figure 3;

Figure 3 is a side elevation of the pump and motor assembly; and

Figure 4 is a transverse sectional view taken on the line 4—4 of Figure 3.

In Figure 1, the heater of my invention is illustrated as installed upon an automobile comprising an engine 10 having a cooling system, the outlet of which is provided by a fitting 12 to which a suitable hose 14 is attached, the hose 14 making a connection with the upper header or tank 16 of a radiator 18. The hose 14 is provided with a thermostatically operated shut-off valve 20, such as is commonly used to prevent or impede circulation of the cooling water until a predetermined temperature, conducive to efficient engine operation, is attained. The automobile has a fire wall 22 separating the passenger compartment 24 from the engine compartment, and is provided with an instrument panel 26.

The heater comprises a water tube radiator 28 which is enclosed in a housing 30. The housing 30 has an outlet conduit 32 secured thereto or formed integrally therewith, this conduit extending through the fire wall 22 and terminating in a hot air outlet 34. The flow of air from the outlet 34 is adapted to be controlled by an adjustable deflector 36, which is mounted for universal movement upon the conduit 32 by means of a pair of links 38 and a ball and socket joint 40. The ball and socket joint 40 and the pivots for the link 38 are provided with a spring-pressed frictional gripping means so that the deflector will be retained in any position in which it is adjusted. A defrosting outlet 42 leads from the conduit 32 and may be connected by a hose or other suitable conduit to suitable outlets adjacent the lower edge of the windshield of the vehicle to defrost the latter. When the defroster is to be operated, the deflector 36 may be moved to a position so as to close or substantially to close the outlet 34, and thus cause rapid flow of heated air through the defroster outlet 42.

When the air in the passenger compartment is cool, air is drawn therefrom through a conduit 44 which leads from the passenger compartment to a fan chamber 46 at the front of the radiator 28. When, however, air drawn from the passenger compartment is heated above a predetermined temperature, it is effective to operate a thermostat 48 which is connected by a wire or tension member 50 with an arm 52 secured to a butterfly or damper valve 54. The valve 54 is located in a conduit 56 which extends forwardly and terminates in a funnel-shaped inlet portion 58 located behind the radiator 18. A filter 60, which may be made of wire mesh and loosely packed with a suitable filtering material, such for example as activated carbon, is detachably secured in the conduit 56 so that it may be readily removed and replaced after the filtering material has lost its filtering properties.

In the usual hot water automobile heater, natural convection is generally relied upon to cause circulation of the hot water through the radiator of the heater. The circulation is thus relatively slow, and the rate at which heat may be transferred from the cooling system of the engine to the passenger compartment of the vehicle is correspondingly slow. To overcome this disadvantage, I have provided a centrifugal circulating pump 62 which is supported by a bracket 64 attached to a motor support 66. The inlet conduit 68 of the pump is connected by means of a hose 70 with the hose 14 of the engine water circulating system, the connection being made ahead of the thermostatically operated valve 28 so that the water is taken from the cooling system of the engine at the place where it is at the highest temperature. The outlet of the pump is connected by a conduit 72 with the radiator 28 of the heater. A return line 74 is connected to the outlet 76 of the heater radiator by a hose or other suitable flexible connection 78 and leads to the hose by which the lower header of the radiator 18 is connected to the engine or water circulating pump.

The impeller of the pump 62 is driven by an electric motor 80, being secured to one end of the armature shaft 81 thereof. The other end of the armature shaft projects through the casing 30 and has a fan 82 secured thereto for the circulation of air through the radiator 28.

The pump 62, as best shown in Figures 2, 3 and 4, comprises a housing 84 which includes the inlet conduit 68 and may conveniently be made by die casting. The housing has a relatively large opening 86 over which a flexible diaphragm 88 is secured, being clamped to the housing 84 by a cover 90 secured by cap screws 92. A bearing 94 having a sleeve portion 93 is secured at the center of the diaphragm 88, being clamped thereto by a plate 96 which is riveted to the bearing 94. The impeller of the pump is illustrated as formed of a plurality of spirally curved blades 98 formed integrally with a hub 100.

The hub 100 has a sidewardly extending cylindrical boss 102 which abuts against a shoulder 104, being held thereagainst by a nut 106 threaded on the end of the shaft 81. The housing 84 is provided with a tangentially extending outlet conduit 108. The cover 90 may conveniently be made of a stamping which is welded to the bracket 64.

As the rotation of the impeller causes a reduction in pressure on the inside surface of the diaphragm 88, the latter exerts a force tending to hold the plate 96 against the cylindrical portion 102 of the hub 100 and thereby maintain a seal. The flexible diaphragm support for the bearing 93, 94, is also of advantage in that it permits slight irregularity in the alignment of the housing 84, and the armature shaft 81 of the motor 80, thus decreasing the cost of manufacture. The fact that the bearing is thus flexibly mounted insures a longer useful life for the pump because bearing wear is reduced to a minimum, the primary function of the bearing being to act as a seal around the shaft 81, rather than as a support for the shaft.

The motor 80 is adapted to be connected to the usual storage battery of the automobile, such connection being completed through a manually operable switch 110 located on the instrument panel of the vehicle which is in series with a thermostatically operated switch 112 secured to the engine block in a manner so as to be responsive to changes in temperature of the water jacket.

In operation, the user closes the switch 110, but such closing of the switch does not necessarily cause the heater to start operation, since the circuit to the motor 80 is not completed until the engine approaches its normal operating temperature. At or shortly prior to the attainment of this temperature, the thermostatically operated switch 112 will close, thus causing the pump 62 to commence the circulation of water from the water jacket of the engine through the radiator 28 and hence through the return line 74 to the inlet of the engine cooling water circulating system. Simultaneously therewith, the air in the passenger compartment of the vehicle is drawn therefrom through the conduit 44, forced through the radiator 28, and through the conduit 32 into the passenger compartment of the vehicle, being directed to flow in the desired direction by the adjustable deflecting plate 36.

After the passenger compartment has been heated to a comfortable temperature, the thermostat 48 will commence operating to open the valve 54, whereupon outside air will be drawn through the conduit 56 and forced through the radiator 28, thus supplying fresh air to the passenger compartment whenever the temperature of the air in the passenger compartment becomes so high that the addition of fresh cold air will not render the occupants uncomfortable. The air drawn from the atmosphere through the conduit 56 is, of course, suitably filtered by the filter 60 so as to remove particles of dust and also, in some instances, to remove other impurities contained in the air. The occupants of the passenger compartment of the vehicle are thus assured that the passenger compartment will, in the first instance, be heated to a comfortable temperature, and that thereafter, as much fresh air will be admixed with the recirculated air as is compatible with the maintenance of a comfortable temperature in the passenger compartment.

The pump 62 is of such small size that it does not place an excessive load upon the motor 80, but nevertheless greatly accelerates the flow of water through the radiator 28, adding materially to the circulation which would normally result from convection.

While I have shown and described a particular embodiment of my invention, it will be apparent to those skilled in the art that numerous modifications and variations may be made without departing from the underlying principles thereof. I therefore desire, by the following claims, to include within the scope of my invention all such modifications and variations by which substantially the results of my invention may be obtained through the utilization of substantially the same or equivalent means.

I claim:

1. A centrifugal water pump assembly comprising a housing having a flexible diaphragm forming one wall thereof, said diaphragm having a substantially central opening formed therein, a bearing bushing secured to said diaphragm and having its bore in alignment with the opening therein, a motor having a frame fixed with respect to said housing and having a rotating driving shaft, said shaft extending through the bore of said bushing, through the opening in said diaphragm and into said housing, and an impeller secured to the end of said shaft.

2. A centrifugal water pump comprising a housing having an inlet and an outlet and having a flexible wall provided with an opening, a bearing and sealing bushing secured to the central portion of said diaphragm and having its bore in alignment with the opening in said diaphragm, a driving shaft extending through said bushing, and an impeller secured to said shaft within said housing.

ARDEN W. LE-FEVRE.